July 16, 1957     E. M. CROWELL ET AL     2,799,034
METHOD OF PROVIDING SHOE WITH MOLDED TREAD MEMBER
Filed Feb. 25, 1954     2 Sheets-Sheet 1
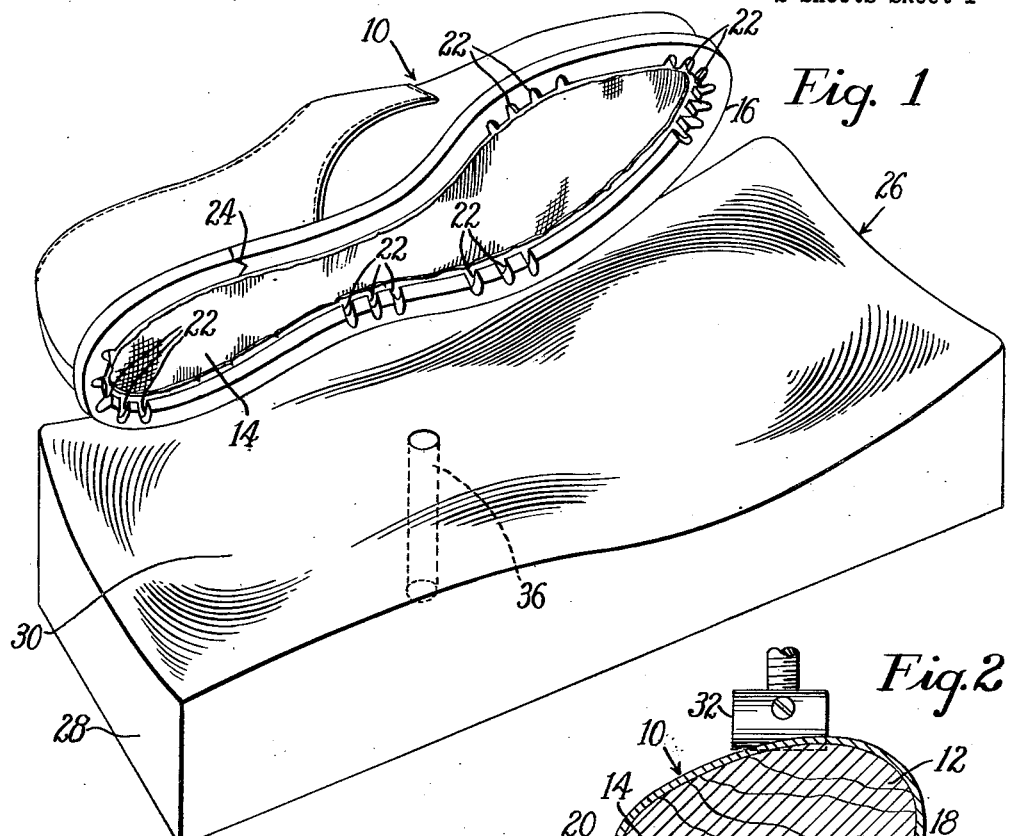
*Fig. 1*
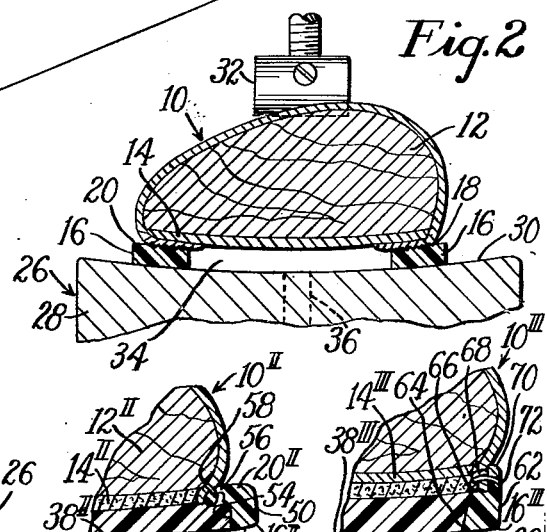
*Fig. 2*
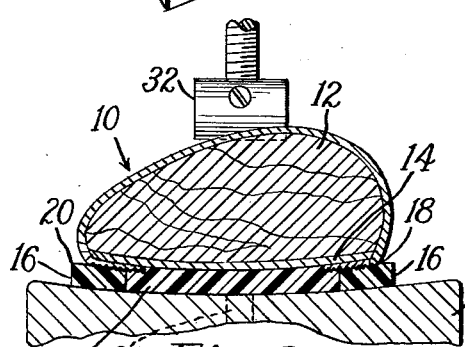
*Fig. 3*    *Fig. 7*    *Fig. 8*
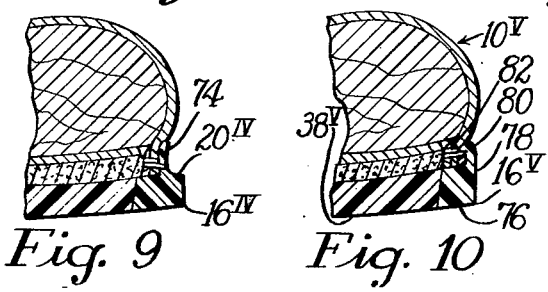
*Fig. 9*    *Fig. 10*
*Inventors*
Ernest M. Crowell
Frank Seabury II
By their Attorney
Thomas J. Ryan

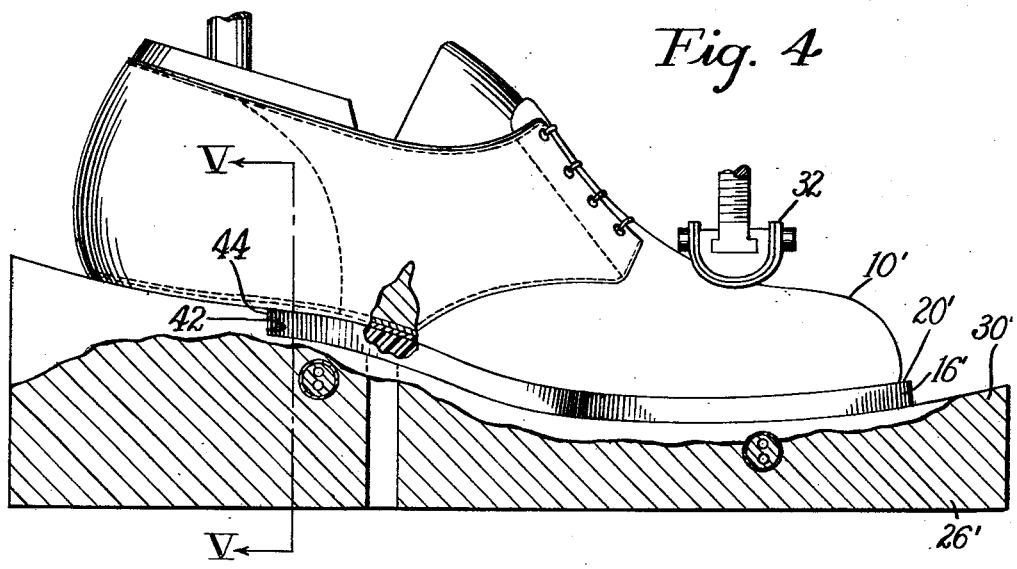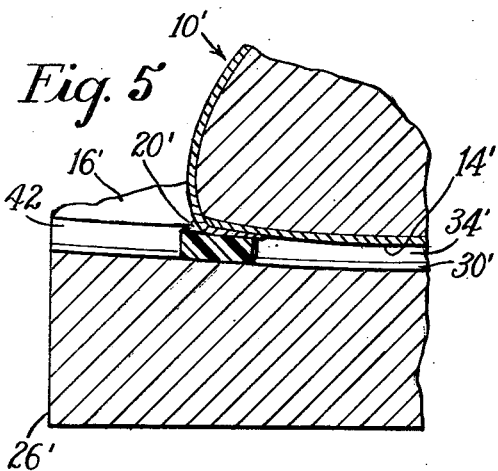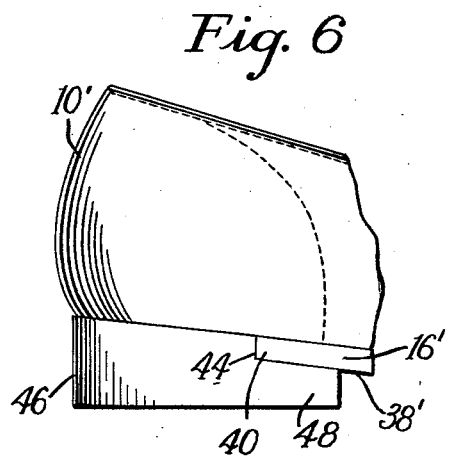

United States Patent Office 2,799,034
Patented July 16, 1957

2,799,034

METHOD OF PROVIDING SHOE WITH MOLDED TREAD MEMBER

Ernest M. Crowell, Beverly, and Frank Seabury II, Manchester, Mass., assignors to United Shoe Machinery Corporation, Flemington, N. J., a corporation of New Jersey Application February 25, 1954, Serial No. 412,410

4 Claims. (Cl. 12—142)

This invention relates to a method for molding a tread surface of plastic on the surface of an article of footwear and particularly to an improved method for forming a sole on a shoe and the improved shoe resulting from the method.

It has been proposed to mold a sole on the bottom of a shoe by a method involving placing "biscuits" or preforms of unvulcanized rubber in a mold and pressing the shoe firmly against the upper face of the mold to form a molding chamber. The mold and rubber are then heated, and the rubber material is formed to the shape of the mold, is bonded to the bottom of the shoe and is vulcanized.

The molding and vulcanization of a rubber sole on an upper involve numerous technical difficulties and economic disadvantages and in the application of Andrew A. Root, Serial No. 56,886, filed October 27, 1948, now Patent No. 2,651,118, of September 8, 1953, there is disclosed a pressureless method for molding a plastic wear-resistant sole on a shoe which avoids many of the difficulties present in the vulcanization method of sole molding. In the illustrated method given in that application, a mold having surfaces for shaping the bottom and edges of a tread surface is brought into engagement with the bottom of a shoe and there is introduced into the space between the shoe and the mold a body of a fluid dispersion of resin particles in a liquid plasticizer having no substantial solvent action on the resin when cool. This fluid dispersion is then caused to set up to a firm resilient condition in which it reproduces the molding surface and is firmly bonded to the bottom of the shoe by heating it to effect at least partial solution of the resin and plasticizer. This method gives excellent results; but a separate mold is required for each size and style of shoe so that a large number of different molds is required for manufacture of a complete range of sizes.

It is an object of the present invention to provide an improved method for molding a wear-resistant sole on a shoe whereby a simple molding surface may be employed for forming soles on a range of shoe sizes.

In the method of the present invention a wall member is secured to a shoe as a rim projecting downward below the bottom of the article. The lower edge of the wall member is then brought into substantially fluid tight engagement with a closing surface which may have any desired contour for molding the bottom surface of a tread member for the shoe. A body of fluid paste dispersion of resin particles in a liquid plasticizer having no substantial solvent action on the resin when cool but capable of at least partly dissolving the resin when heated is introduced into the space defined by the bottom of the shoe, the wall member and the closing surface, and the dispersion is solidified by heat. When solidified, the body of dispersion adheres firmly to the shoe bottom and, depending on the nature of the wall member, adheres firmly to, or is integrated with the wall member. The wall member serves the dual purpose of providing an accurately placed retaining wall and of spacing the closing surface from the bottom of the shoe for the molding of a body of resin dispersion on the shoe bottom so that it is unnecessary to provide molding surfaces equipped with side walls for each of the various shoe sizes it is desired to make; and as a second action, the wall member improves the union between the molded tread surface and the shoe bottom at the edge portions since the wall member may be secured to the shoe by stitching, cementing, or otherwise to provide an extremely strong union.

The invention will be further described in connection with the accompanying drawings forming part of the present disclosure.

In the drawings,

Fig. 1 is an angular view of a shoe having a wall member secured around the periphery of the bottom, and a contoured molding plate for use in forming a tread surface on the shoe;

Fig. 2 is an elevational view in section showing a shoe upper on a last with the wall member disposed in engagement with a contoured molding plate;

Fig. 3 is an elevational view similar to Fig. 2 showing resin material solidified to provide a tread surface within the space enclosed by the wall member, shoe bottom and molding plate;

Fig. 4 is a side elevational view partly in section of a shoe having a wall member secured around the periphery of the forward portion of the shoe and a modified contoured molding plate provided with a ledge against which the ends of the wall member abut;

Fig. 5 is a fragmentary sectional elevational view taken on the line V—V of Fig. 4 showing the ledge sealing off the space defined by the wall member, shoe bottom and contoured surface of the molding plate;

Fig. 6 is a fragmentary side view of the heel portion of a completed shoe made using the molding plate of Fig. 4;

Fig. 7 is a fragmentary elevational view in section of a shoe with tread surface molded thereon using a second wall member shape;

Fig. 8 is a fragmentary elevational view in section of a shoe with tread surface molded thereon using a third wall member shape;

Fig. 9 is a fragmentary elevational view in section of a shoe with tread surface molded thereon using a fourth wall member shape; and Fig. 10 is a fragmentary elevational view in section of a shoe with tread surface molded thereon using a fifth wall member shape.

In the method of the present invention a boot or shoe 10 is mounted on a suitable form such as a last 12 which will retain it in shaped position for the molding of a sole thereon. For convenience in explanation, the process will be described first in the formation of a sole on a conventional flat lasted shoe upper in which the upper has been shaped and secured to a midsole or sock lining 14. A wall member 16 is permanently secured to the shoe along the bottom edge as a rim extending downwardly below the bottom of the shoe outlining an area on the bottom of the shoe. In the shoe shown in Figs. 1, 2 and 3, the wall member 16 is secured to the shoe upper by a cement bond 18, but stitching or other known modes of fastening the strip may be used. Ordinarily, the wall member 16 will be at the periphery of the shoe bottom and will outline a full sole as shown in Fig. 1 or a forward portion of the shoe sole extending forward from about the breast line as shown in Fig. 4. In a preferred form this wall member 16 is so constructed and formed as to simulate a sole edge and may have an exposed upper surface 20 which may be shaped to simulate stitched, grooved or otherwise shaped conventional welting. For convenience in making the necessary bend at the more sharply curved portions of the shoe such as at the toe and heel, notches 22 may be provided on the inner portions of the wall member 16 at such portions. The ends 24 of the welting strip 16 are brought together in fluid-tight engagement just forward of the heel portion of the shoe on the inner edge. It has been found that a fluid-tight joint is most effectively formed where the ends of the wall member form complementary angles, for example a V-shaped notch and a V-shaped projection which are fitted together.

The wall member strip may be formed of any strong, tough material such as those normally used for welting which are capable or may be treated to be capable of bonding strongly to plasticized resin. For example, leather or vinyl welting material may be used. It is, however, preferred to use a plasticized resin strip similar to the plasticized resin solidified to form the tread member in the present process since in this combination the wall member and tread member become an integral body and the greatest possible strength is obtained.

The bottom of the shoe, in this case the bottom of the insole 14, may be coated or lightly impregnated with a thin fluid, resinous material, suitably an aqueous dispersion of resin particles such as a resin latex. A suitable resin latex is a 54.6% solids polyvinyl chloride latex. Other aqueous dispersions or latices of resins compatible with the resin to be molded on the shoe may be used. When the bottom surface of the shoe has been treated with the resinous material, it is dried if necessary and is then ready for the molding operation. It is found that this coating or impregnating treatment gives a very strong bond between the shoe and a sole molded thereon. It is to be understood, however, that the treatment may be omitted.

A molding plate 26 adapted for cooperating with a shoe bottom 14 and wall member 16 for forming a sole is shown in cross section in Fig. 1 and comprises a relatively thick body portion 28 having an upper surface 30 whose contour is complementary to the desired contour of the shoe sole bottom. Since the edges of the sole member are defined by the wall member 16 attached to the shoe 10, the contoured plate is usable for molding a range of sizes of shoe soles. The sole molding plate 26 may be of metal or suitable material capable of being formed to the desired shape and of withstanding heat and transmitting heat to fluid material in contact therewith.

The shoe 10 is disposed on the molding plate 26 with the wall member 16 on the bottom of the shoe 10 pressed for example by suitable pad members 32 (see Figs. 2 and 3) into liquid-tight engagement with the contoured surface 30 of the molding plate 26 to define between the bottom of the shoe 14, the wall member 16 and the upper surface 30 of the molding plate 26, an enclosed space 34 for the formation of a tread member of suitable thickness. Desirably, the distance between the bottom 14 of the shoe and the upper surface 30 of the molding plate 26 should not be less than 3/32 of an inch. A fluid dispersion of resin particles in a liquid plasticizer is injected into the space either through a temporary opening in the wall member 16, for example with an injection needle, through a suitable inlet opening 36 in the molding plate 26, or in special situations, through a temporary opening in the insole or sock lining member 14. A sufficient quantity of the resin dispersion is introduced to fill the space defined by the bottom of the insole 14, the wall member 16 and the surfaces 30 of the molding plate 26 when the shoe is positioned in molding relation to the molding plate 26 as shown in Fig. 2.

Resin dispersions employed in the method and article of the present invention are liquid to pasty mixtures of from 30% to 70% of thermoplastic resin particles in from 70% to 30% of a liquid plasticizer having no substantial solvent action on the resin when cool, but capable of combining physically with the resin particles when the dispersion is heated to form a uniform mass of plasticized resin and to solidify said mass. The relative proportions of resin and plasticizer selected will depend on the physical properties desired in the final tread surface. For example, high relative proportions of plasticizer will give a softer more rubbery sole than lower relative proportions within the range.

The particle size of the dispersed resin may vary within relatively wide limits. However, particles of from 275 to 325 microns have been found very satisfactory.

Resin dispersions, liquid or pasty at room temperature, which have been found particularly satisfactory in the process of the present invention include: a dispersion of particles of a copolymer of vinyl chloride and vinyl acetate containing from 85% to 88% of vinyl chloride in a substantially equal quantity by weight of dioctyl-phthalate; a dispersion of 50 parts of particles of a vinyl chloride, vinyl acetate copolymer containing 85% to 88% of vinyl chloride, in 45 parts of dioctyl-phthalate; and a dispersion of 50 parts of a vinyl chloride, vinyl acetate copolymer, and 49 parts of an ester type plasticizer which may be tricresyl phosphate, dibutyl phthalate or dioctyl phthalate. Dispersions of other resins, including polymethyl methacrylate and vinyl chloride-vinylidene chloride copolymers in plasticizers in which they are dissolved or gelled when heated, may be employed, provided the resin body obtained on heating the resin dispersion possesses the toughness, hardness and resilience to render it suitable for use as a shoe sole.

It has been found desirable in dispersions of the type employed to use a stabilizer such as strontium naphthenate.

Limited amounts of fillers may be incorporated in the dispersion prior to molding. Fillers which have been employed include fibers of copolymerized vinyl chloride and vinyl acetate, sisal fiber, diatomaceous earth and clay. Other fillers may be used. The percentage of fillers will depend on the stiffness, strength, or other property desired. The dispersion may also include any compatible dye or pigment or combination of these. Where pigment is used it may first be ground into the plasticizer.

The shoe is held with the wall member 16 in fluid-tight engagement with the molding plate 26 by any suitable pressure device such as the pad 32; and the assembly of shoe and molding plate with resin dispersion in the space between them is subjected to heating to convert the resin dispersion to solid condition. The heating may be effected in various ways such as placing the assembly on a hot plate and maintaining it there for a period of from 5 to 20 minutes after the resin dispersion has reached a temperature to cause solution and/or gelation of the resin by the plasticizer, e. g., a temperature of from 270° to 325°, with the vinyl chloride-vinyl acetate copolymer dispersions referred to above. Other heating means may be employed including placing the entire assembly in a heating chamber or the application of a high frequency electric field.

After the heat treatment the pressure of the pad member 32 holding the shoe in contact with the molding plate 26 is released and the shoe is lifted from the molding plate 26.

The edges of the shoe sole 38 thus formed present without further treatment the appearance of a shoe having a conventional sole; and the shoe possesses exceptional resistance to separation of the shoe sole 38 from the upper by reason of the firm union between the wall member 16 and the upper 10 and the strong bond between or integration of the wall member 16 and the sole 38.

The method is equally applicable to shoes such as the McKay type where no welt or other flange is normally employed. With this type of shoe, the wall member 16 is secured to the periphery of the bottom portion of the shoe 10, preferably by cementing using conventional sole attaching cements. Further steps in the molding of a tread member 38 on such a shoe are the same as for shoes as the stitchdown.

In accordance with a modification of the process of the present invention (see Figs. 4, 5 and 6), the wall member 16 may extend only part way around the periphery of the bottom portion of a shoe 10', for example from approximately the heel breast line on one side to the heel breast line on the other. With this arrangement a modified molding plate 26' is used which is provided with a step 42 against which the ends 44 of a wall member 16' are butted to enclose a space between the step 42, the contoured surface 30' of the molding plate 26', the wall member 16' and the bottom 14' of the shoe 10'. Resin paste dispersion is introduced into this enclosed space 34' and solidified by the same procedure given above in connection with the formation of a tread member over the entire surface of the shoe bottom. As shown in Fig. 6, a special heel 46 is attached to a shoe 10' having a partial molded sole 38', portions 48 of the heel extending over the rearward end of the sole 38'.

It will be understood that the process is subject to many variations within the spirit of the invention, for example, as described in the patent to Root, No. 2,651,118, above referred to, fibrous material inserts may be secured to the bottom of the insole in such manner that they will be enclosed within the body of resin molded onto the bottom of the shoe in spaced relation to the tread surface. These inserts may be incorporated by attaching them by any convenient means such as tacks, nails or adhesive to the bottom surface of an inner sole such as the insole of a welt type shoe or a sock lining of a slip lasted shoe and carrying out molding operations as described above.

A variety of wall member cross sections and constructions for attaching the wall member to the shoe may be employed.

Fig. 7 shows a wall member 16" construction particularly suited for use with pre-welt shoes 10" as illustrated, but also useful with normal welt type shoes. As shown, the wall member 16" includes an outer surface portion 50 which is the sole edge in the finished shoe, a bottom portion which will be aligned with the bottom portion 52 of the sole member 38" to be formed, an inner edge portion 54 which joins with or bonds to the sole member 38" and a top surface 20" which may simulate the upper surface of welting. A flexible lip member 56 extends inwardly at the upper portion of the wall member 16" and has a channel formed therein to receive stitches 58 to hold the wall member 16" to the shoe upper 10". This type wall member 16" is stitched to the edge of the upper in a prewelt shoe or may be stitched to the rib of a Goodyear type shoe (not shown). The shoe upper 10" on a last 12" and with the wall member 16" secured thereto is placed on a contoured molding plate 26 with the wall member 16" pressed in sealing engagement with the surface 30 of the contoured plate 26. With this construction and particularly with pre-welt shoes it is desirable to employ a holddown for the wall member 16" to insure that the wall member 16" is held flat against the contoured plate 26. A device useful for holding the wall member in a desired relation forms part of the molding apparatus shown in the copending application of Andrew A. Root, entitled Apparatus for Molding Tread Members to Shoe Uppers, Serial No. 227,689, filed May 22, 1951, now Patent No. 2,687,554. Briefly described, the holddown device shown in the patent comprises rigid supporting members adjustably mounted on a supporting plate and carrying resilient pressure pads which may be used to holddown projecting portions of the wall member in sealing engagement with the heightwise variations of the contour plate.

As in the first-described modification, the resin paste dispersion is then introduced into the space between the wall member 16", the insole portion 14" of the shoe, and the contour plate 26, and the paste dispersion is cured by application of heat to provide a structure such as shown in Fig. 7.

Fig. 8 illustrates a wall member 16''' cross section particularly adapted for use with slip lasted shoes. The wall member 16''' comprises a body portion having a bottom surface 60 to be disposed in alinement with the bottom surface of the shoe sole 38''' and an inner edge portion 64 for union with the main body of the shoe sole 38''' and an edge portion 62 to provide an edge surface for the shoe sole. The upper portion of the wall member provides a shoulder 66 on which rests the seam 68 between upper 10''' and sock lining 14''', and an upwardly projecting flange 70 at the outer edge of the wall member 16''' which serves as an attaching portion through which the stitches 72 are passed to bind the wall member 16''' to the shoe upper 10'''. The molding of a shoe sole on a shoe of this construction is similar to that described in connection with the formation of a sole on the upper illustrated in Figs. 1, 2 and 3.

Fig. 9 illustrates a modification of the wall member 16''' of Fig. 8 which differs from that of Fig. 8 in that the body portion of the wall member $16^{IV}$ extends outwardly beyond the upwardly projecting flange 74 to provide an upper face $20^{IV}$ to simulate a welt construction.

Fig. 10 shows a wall member $16^V$ comprising a body portion of which one face 76 is intended for disposition in alinement with the bottom surface of a shoe sole $38^V$ to be formed and another surface 78 is exposed at the outer edge of the shoe sole $38^V$. This wall member $16^V$ is provided with a flexible side flange 80 having its exposed surface forming a continuation of the surface 78 of the wall member $16^V$ intended for use as the edge portion of the sole. In this construction the flange 80 is secured by stitching 82 to the shoe upper $10^V$ with the body portion of the wall member $16^V$ in inverted position; that is, with the flange 80 downward and the face of the wall member $16^V$ which will form the edge of the shoe sole positioned against the surface of the shoe upper. Thereafter the flange 80 is bent to bring the wall member $16^V$ to its final position with the flange 80 bent upon itself to give an appearance of a platform cover at the edge of the shoe sole. When the wall member $16^V$ has been brought to this relation, the formation of a shoe sole is carried out as in the first-described method.

Numerous other modified structures can be prepared using the principles taught in the present disclosure.

Having thus described our invention, what we claim as new and desire to secure by Letters Patent of the United States is:

1. The method of providing a shoe with a molded tread member of substantial thickness which comprises securing a wall member to the shoe as a rim projecting downward below the bottom of the shoe, pressing the lower edge of said wall member in fluid-tight engagement with a mold surface, said bottom, wall member and mold surface defining an enclosed space and said wall member constituting side walls of said enclosed space and spacing the bottom of said shoe from said mold surface, thereafter while maintaining pressure of said wall member against said mold surface to keep said space closed, injecting into said space a readily flowable solidifiable mixture to substantially fill said space, solidifying said mixture in self bonding relation permanently to said bottom and to said wall member to form with said wall member a molded tread member firmly adherent to the shoe, and removing said shoe and adherent tread member from engagement with said mold surface.

2. The method of providing a shoe with a molded tread member of substantial thickness which comprises securing a wall member to the shoe as a downwardly projecting rim defining a cavity on the bottom of the shoe, said wall member presenting an outer surface forming a tread member edge and a lower edge projecting downward a distance from said bottom corresponding to the desired thickness of tread member edge, pressing said lower edge in fluid-tight engagement with a mold surface which is generally of the same configuration as the bottom surface of said tread member and extends outwardly at least substantially to the outer edge of said wall member, said bottom, wall member and mold surface defining an enclosed space and said wall member constituting side walls of said enclosed space and spacing the bottom of said shoe from said mold surface, thereafter while maintaining pressure of said wall member against said mold surface to keep said space closed, injecting into said space a readily flowable solidifiable mixture to substantially fill said space, solidifying said mixture in self bonding relation permanently to said bottom and to said wall member to form with said wall member a molded tread member firmly adherent to the shoe, and removing said shoe and adherent tread member from engagement with said mold surface.

3. The method of providing a shoe with a molded tread member of substantial thickness which comprises securing a wall member to outer portions at the bottom of the shoe as a downwardly projecting rim following the heightwise and peripheral shape of said bottom and defining a cavity on said bottom, said wall member presenting an outer surface forming a tread member edge and a lower edge projecting downward a distance from said bottom corresponding to the desired thickness of tread member edge, pressing said lower edge in fluid-tight engagement with a tread molding surface complementary in contour to the exposed bottom surface of the tread member to be formed and extending outwardly at least substantially to the outer edge of said mold member, said bottom, wall member and tread molding surface defining an enclosed space and said wall member constituting side walls of said enclosed space and spacing the bottom of said shoe from said tread molding surface, thereafter while maintaining pressure of said wall member against said tread molding surface to keep said space closed, injecting into said space a fluid resin paste dispersion to substantially fill said space, heating said paste dispersion to solidify it and to bond the solidified dispersion permanently to said bottom and to said wall member to form with said wall member a molded tread member firmly adherent to the shoe, and removing said shoe and adherent tread member from engagement with said surface, said wall member being composed of a resinous material similar to the resin of said paste dispersion, said paste dispersion being a mixture of resin particles dispersed in a liquid plasticizer in which said resin particles are not dissolved to a substantial extent when cold but are dissolved when the paste dispersion is heated and being fluid when cool prior to said heating, and said heating raising the temperature of said plasticizer to cause at least partial solution of the resin particles and the resin of said wall member to convert the dispersion into a solid resilient body of plasticized resin and to unite the wall member and the solidified resin integrally together.

4. The method of providing a shoe with a molded tread member of substantial thickness which comprises securing a wall member strip to the shoe as a downwardly projecting rim partially surrounding an area on the bottom of said shoe, pressing the lower edges of said wall member in fluid-tight engagement with a tread molding surface complementary in contour to the exposed bottom surface of the tread member to be formed and extending outwardly at least substantially to the outer edge of said wall member strip, and pressing the free ends of the wall member strip and the portion of the bottom of said shoe between said ends into fluid-tight engagement with a ledge rising from said tread molding surface, said bottom, wall member, tread molding surface and ledge defining an enclosed space and said wall member constituting side walls of said enclosed space and spacing said bottom of said shoe from said tread molding surface, thereafter while maintaining pressure of said wall member against said tread molding surface and ledge to keep said space closed, injecting into said space a readily flowable solidifiable mixture to substantially fill said space, solidifying said mixture in self bonding relation permanently to said bottom and to said wall member to form with said wall member a molded tread member firmly adherent to the shoe, and removing said shoe and adherent tread member from engagement with said mold surface.

References Cited in the file of this patent

UNITED STATES PATENTS

| 1,735,986 | Wray | Nov. 19, 1929 |
| 2,470,089 | Booth | May 17, 1949 |

FOREIGN PATENTS

| 661,169 | France | Mar. 4, 1929 |
| 614,578 | Germany | June 15, 1935 |